«12» United States Patent
Williamson et al.

(10) Patent No.: US 10,719,870 B2
(45) Date of Patent: Jul. 21, 2020

(54) MIXED REALITY WORLD INTEGRATION OF HOLOGRAPHIC BUTTONS IN A MIXED REALITY DEVICE

(71) Applicant: Microsoft Technology Licensing, LLC, Redmond, WA (US)

(72) Inventors: Robert Williamson, Seattle, WA (US); Mehdi Ziat, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 15/635,105

(22) Filed: Jun. 27, 2017

(65) Prior Publication Data

US 2018/0374143 A1    Dec. 27, 2018

(51) Int. Cl.
*G06Q 30/00* (2012.01)
*G06Q 30/06* (2012.01)
*G06T 19/00* (2011.01)
*G06F 3/0481* (2013.01)
*G06F 3/01* (2006.01)
(Continued)

(52) U.S. Cl.
CPC ......... *G06Q 30/0641* (2013.01); *G06F 3/011* (2013.01); *G06F 3/017* (2013.01); *G06F 3/04815* (2013.01); *G06Q 20/12* (2013.01); *G06Q 30/0635* (2013.01); *G06Q 30/0643* (2013.01); *G06T 19/006* (2013.01); *G02B 27/0172* (2013.01); *G02B 2027/0174* (2013.01)

(58) Field of Classification Search
None
See application file for complete search history.

(56) References Cited

U.S. PATENT DOCUMENTS 7,653,603 B1 * 1/2010 Holtkamp, Jr. ...... A47G 29/141
                                                             705/50
8,633,946 B2    1/2014 Cohen
(Continued)

FOREIGN PATENT DOCUMENTS

EP     3062281 A1      8/2016
WO  2001069364 A2      9/2001
WO  2016175412 A1     11/2016

OTHER PUBLICATIONS

Joseph J. LaViola Jr.; "3D Gestural Interaction: The State of the Field"; 2013; Hindawi Publishing Corporation; ISRN Artificial Intelligence vol. 2013, Article ID 514641, 18 pages, http://dx.doi.org/10.1155/2013/514641 (Year: 2013).*

(Continued)

*Primary Examiner* — Naeem U Haq
*Assistant Examiner* — Norman Donald Sutch, Jr.

(57) ABSTRACT

Disclosed is system and method for mixed reality world that incorporates a holographic button (e.g., a 3D object) that can be downloaded from the website of a provider of a good, data content, or a service (item). The holographic button enables a user in the mixed reality world to order the item by interacting with the holographic button. The user in the mixed reality world can place the holographic button relative to a relevant real-world object. Whenever the user interacts with the real-world object through their mixed reality world (i.e., virtual interaction with the real-world object), the holographic button can appear with that real-word object, allowing the user to order the item associated with the holographic button.

17 Claims, 6 Drawing Sheets

(51) Int. Cl.
*G06Q 20/12* (2012.01)
*G02B 27/01* (2006.01)

(56) References Cited

U.S. PATENT DOCUMENTS

| | | | |
|---|---|---|---|
| 9,230,368 B2 | 1/2016 | Keane et al. | |
| 2008/0243788 A1* | 10/2008 | Reztlaff | G06F 16/3331 |
| 2009/0113349 A1 | 4/2009 | Zohar et al. | |
| 2010/0017722 A1* | 1/2010 | Cohen | A63F 13/10 |
| | | | 715/740 |
| 2010/0208033 A1* | 8/2010 | Edge | G06F 3/012 |
| | | | 348/46 |
| 2013/0297460 A1* | 11/2013 | Spivack | G06Q 30/0643 |
| | | | 705/27.2 |
| 2014/0100994 A1 | 4/2014 | Tatzel et al. | |
| 2014/0168261 A1* | 6/2014 | Margolis | G06F 3/011 |
| | | | 345/633 |
| 2016/0148304 A1* | 5/2016 | Srinath | G06F 16/955 |
| | | | 705/27.1 |
| 2016/0154563 A1* | 6/2016 | Newton | G06F 3/04815 |
| | | | 715/762 |
| 2016/0378887 A1 | 12/2016 | Maldonado | |
| 2017/0024808 A1 | 1/2017 | Plattsmier et al. | |
| 2018/0276895 A1* | 9/2018 | Hodge | G09G 5/003 |
| 2018/0323972 A1* | 11/2018 | Reed | G06F 1/163 |

OTHER PUBLICATIONS

Natour, Lydia, "Are Holographic Products the Future of E-Commerce?", https://web.archive.org/web/20170118112406/http://www.brainsins.com/en/blog/are-holographic-products-the-future-of-e-commerce/1395, Published on: Jan. 18, 2017, 5 pages.

Stinson, Liz, "So Smart: New Ikea App Places Virtual Furniture in Your Home", https://www.wired.com/2013/08/a-new-ikea-app-lets-you-place-3d-furniture-in-your-home/, Published on: Aug. 20, 2013, 12 pages.

"International Search Report and Written Opinion Issued in PCT Application No. PCT/US18/033766", dated Aug. 22, 2018, 12 Pages.

* cited by examiner

MIXED REALITY WORLD INTEGRATION OF HOLOGRAPHIC BUTTONS IN A MIXED REALITY DEVICE

BACKGROUND

A mixed reality world integrates virtual objects (holograms) with a user's view of the real world. Mixed reality devices augment the real world with virtual objects that aim to look as if they are really placed within that world. A mixed reality device allows the user to view their real-world surrounding through a semi-transparent display in the case of a wearable device, or a live video feed in the case of a laptop device, a smartphone, or other handheld computer. Virtual objects can then be presented on the display, which appear superimposed on the user's view of their real-world surrounding, thus merging virtual reality with physical reality.

A mixed reality devices can lock the position of a virtual object relative to real-world objects (referred to as "world locking" a virtual object). For example, a virtual flower pot can be placed onto a real-world table and appear as if it is on the surface of the real-world table. The virtual flower pot is spatially locked with respect to the surface of the real-world table, and may leave the user's field of view as the user moves about in their real-world surrounding. If the virtual object is world locked to a moving real-world object, the virtual object may move with the moving real-world object.

Additionally, mixed reality devices can also show notifications and other forms of information in a way that is locked to the display of the mixed reality device, rather than to real-world objects. This viewing mode can be useful for invoking applications such as a web browser, an email client, and so on. In this viewing mode, the virtual object merely overlays the user's field of view independently of real-world objects in their field of view.

SUMMARY

A mixed reality device in accordance with the present disclosure can include a display, one or more computer processors, and a computer-readable storage medium comprising instructions for controlling the one or more computer processors. Processing performed by the one or more computer processor can include instantiating a holographic button (virtual 3-dimensional object) associated with an item of interest to a user of the mixed reality device. Item-related data associated with the item can be received from the website of a provider of the item. The item-related data can include holographic data to display the holographic button on a display of the mixed reality device. The holographic button can be world-locked to a fixed spatial location in a real-world surrounding relative to the mixed reality device.

The user of the mixed reality device can be provided with access to the holographic button, thus allowing the user to obtain the item by interacting with the holographic button. For example, the holographic button can be presented on the display to superimpose the holographic button onto a view of the user's real-world surrounding. The mixed reality device can detect a user-made gesture directed to the holographic button, and in response generate and send an order request for the item to the provider.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure can be practiced. Similar or same reference numbers may be used to identify or otherwise refer to similar or same elements in the various drawings and supporting descriptions. In the accompanying drawings.

DETAILED DESCRIPTION

Figure 1:
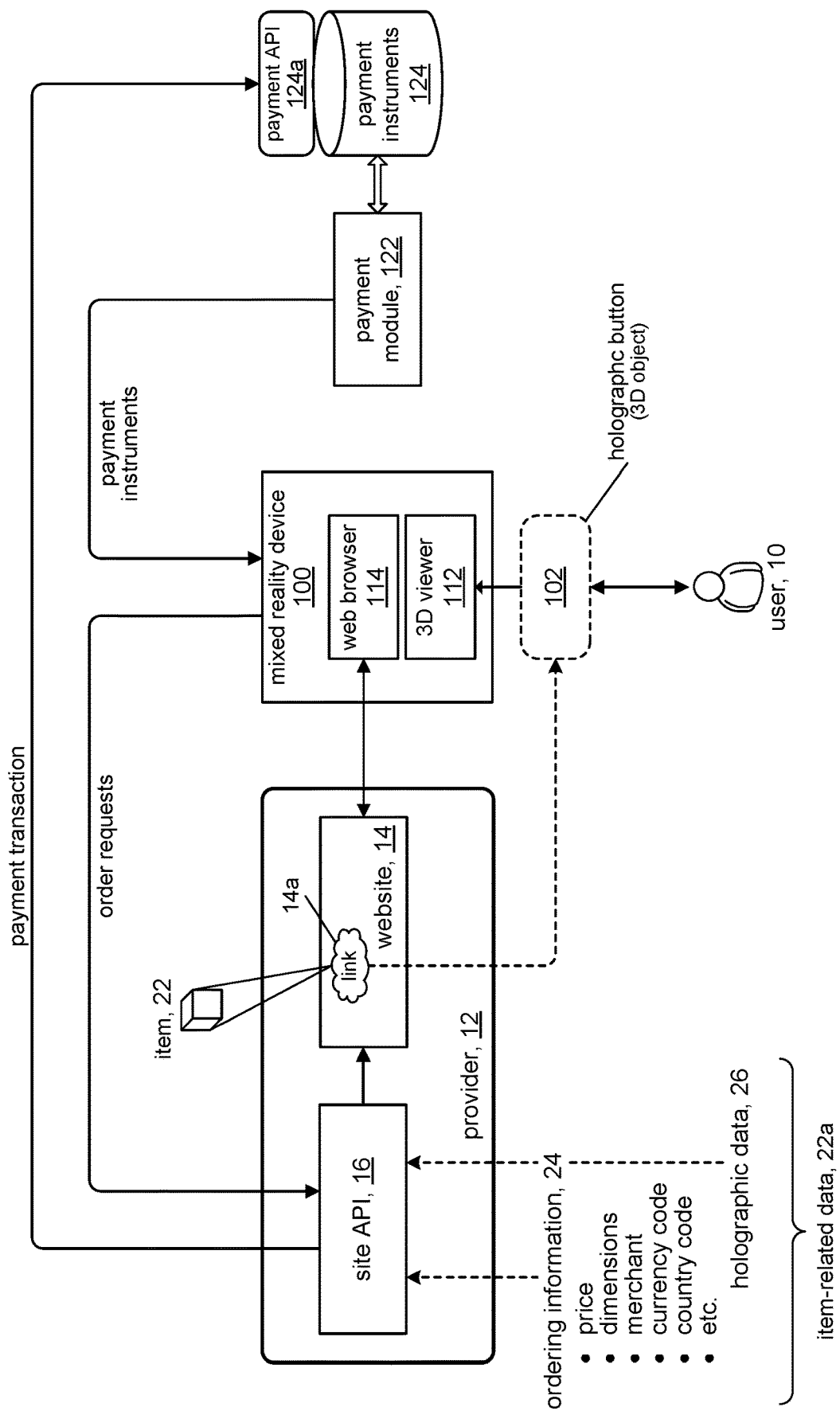
FIG. 1 depicts a simplified block diagram of a system environment according to certain embodiments.

The present disclosure relates generally to mixed reality environments. A user in a mixed reality world can drag an image or link from a website to generate/download a 3D model that represents a holographic button, and then drop or place it on a relevant real-world object as perceived in their mixed reality world. The holographic button is associated with an item (goods, data content, services, and the like), and includes item-related data that allows the user to order the item simply by interacting (e.g., air tapping) with the holographic button. The user can instantiate several holographic buttons in their mixed reality world. The user need only interact with a holographic button to initiate an action to order the item associated with that holographic button, without having to navigate to a website to order the item.

It can be appreciated that navigating the Internet in a mixed reality world can be taxing to the user, requiring gestures and textual input to access various websites. User interaction performance and reliability can be enhanced by the use of holographic buttons in accordance with the present disclosure. Since the holographic button is already associated with information for obtaining the item, the amount of user interaction to obtain the item over the Internet using the holographic button is significantly reduced.

It will become clear that the use of holographic buttons in accordance with the present disclosure to obtain goods or services can reduce bandwidth usage by the mixed reality device. Since the holographic button already provides the information needed by the user to initiate a request to order the item, the user can skip steps that require network resources such as accessing the provider's website, navigating to the particular web page that contains the item, and interacting with the web page to initiate an order.

In addition to reducing bandwidth usage, the use of holographic buttons in accordance with the present disclosure can reduce storage requirements in the mixed reality device for storing browser history. When a user is required to search the Internet for items of interest, especially consumable items that require re-ordering, the browser history can become cluttered from those search efforts repeated over time. Associating such items with holographic buttons in accordance with the present invention obviates the need for repeated searches of those items and thus can reduce the amount of browser history that is accumulated in the memory of the mixed reality device.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 illustrates the use of a holographic button 102 in a mixed reality experience in accordance with the present disclosure. More particularly, the user 10 can interact with the holographic button 102 to obtain an item 22 of interest to the user 10. Since the holographic button 102 is virtual, it can visually appear as any image. In some instances, the holographic button 102 can appear as some form of a button. In other instances, the holographic button 102 can appear as some other image; e.g., the image may be representative of the item 22 or may be completely arbitrary.

In the particular use case depicted in FIG. 1, the item 22 is supplied by a provider 12. The provider 12 supports a website 14 which the user 10 can visit to access the item 22. The item 22 can be a good or service that can be ordered over the Internet. The item 22 can be data content that can be downloaded over the Internet, and so on. In some cases, the item 22 can be a paid for subscription for content or a service that the user 10 can request on demand. In other cases, the user 10 pays for the item 22, but that is not a necessary component in the present disclosure.

The configuration shown in FIG. 1 includes a mixed reality device 100 that can provide a mixed reality experience to the user 10 by immersing the user 10 in a mixed reality world. The mixed reality device 100 can include any number of applications that can execute on the device. In various embodiments, for example, the mixed reality device 100 can include a 3D viewer 112, a web browser 114, and so on. As explained in more detail below, the web browser 114 can provide access to the provider's website 14, where the user 10 can instantiate a holographic button 102 associated with the item 22 of interest. The 3D viewer 112 can be used to interact with the user 10 to obtain the item 22 using the holographic button 102.

In some embodiments, the 3D viewer 112 can be implemented as a platform-level application, where its functionality can be provided as services accessed via suitable application programming interfaces (APIs). In FIG. 1, for example, the provider 12 may provide services via site API 16 that allow the 3D viewer 112 to submit order requests to the provider 12. The 3D viewer 112 can incorporate users' payment instruments into the order requests via a payment module 122.

The site API 16 can include services to support the provider's website 14. For example, the site API 16 can include functionality for receiving, storing, and otherwise managing item-related data 22a for items maintained on the website 14. Item-related data 22a can include ordering information 24 that relate to pricing of the item 22 (e.g., price, monetary exchange rates, etc.), descriptions and attributes of the item 22 (e.g., dimensions, color, size, etc.), and other information that may be needed to fulfill orders for the item 22. In accordance with the present disclosure, the item-related data 22a can also include holographic data 26 for the holographic button 102.

The payment module 122 can receive, store, and otherwise manage users' payment instruments. The payment module 124 can employ a repository 124 to store the users' payment instruments. The repository 124 can include a payment API 124a to provide secure access to the payment instruments and to conduct payment transactions.

Figure 2:
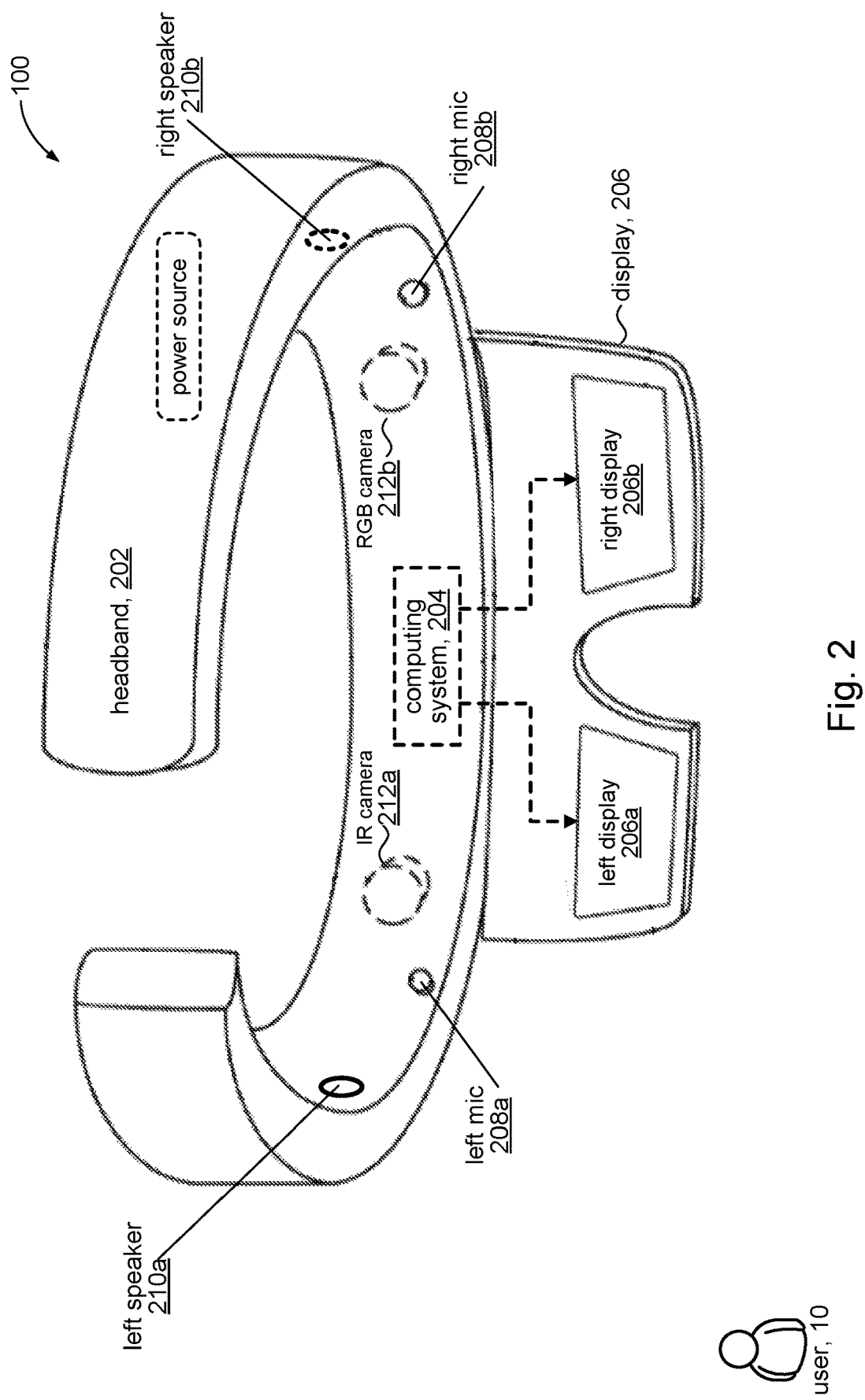
FIG. 2 shows an example of a mixed reality device.

FIG. 2 illustrates a mixed reality device 100 in accordance with some embodiments of the present disclosure. The mixed reality device 100 that can take the form of a wearable device, such as shown in FIG. 2. Different wearable form factors include goggles, glasses, and the like. An example is the HOLOLENS® wearable mixed reality device developed, manufactured, and sold by the assignee of the present disclosure. It will be appreciated that the mixed reality device 100 can be implemented in other formats such as, for example, in a computer tablet, smartphone, or other handheld computing device.

The mixed reality device 100 can include a headband 202 for wearing the device. The headband 202 can be adjustable to provide a suitable fit for the user 10. The headband 202 can house or support various components comprising the mixed reality device 100.

The mixed reality device 100 can include a computing system 204, which among other things, can display virtual objects (holograms) to the user 10 on a display 206. In some embodiments, the display 206 can be partially transparent so that the user 10 can view their real-world surrounding through the display. The display 206 can comprise a left display panel 206a and a right display panel 206b. The left and right display panels 206a, 206b can be implemented using any suitable technology; e.g., using transparent organic light emitting diodes (OLED), edge-mounted light modulators, and so on. In some embodiments where the mixed reality device 100 is a handheld device (e.g., computer tablet, smartphone, etc.) the display 206 can be the display of the handheld device.

Virtual objects displayed or presented on the display 206 are visually superimposed onto the user's field of view such that the virtual objects appear with the real-world objects. The left and right display panels 206a, 206b can provide a stereoscopic effect so as to visually place the virtual object at a desired depth by presenting separate images of the virtual object in the left and right display panels 206a, 206b.

In some embodiments where the mixed reality device 100 is a handheld device (e.g., computer tablet, smartphone, etc.) the display 206 can be the display of the handheld device. The real-world surrounding can be presented as a live feed on the display 206 (e.g., captured by a camera 212b), and virtual objects can be superimposed on the live feed.

The mixed reality device 100 can include left and right microphones 208a, 208b for receiving voice input from the user 10; e.g., for voice commands. Left and right speakers 210a, 210b can provide stereo audio to the user 10.

The mixed reality device 100 can include optical sensors such as an infra-red (IR) camera 212a and an outward facing optical wavelength RGB camera 212b to capture video and still images. The cameras 212a, 212b can capture the user's real-world surrounding. Additional sensors such as accelerometers, gyroscopes, etc. (not shown) can provide position and orientation information of the mixed reality device 100. The optical sensor information and the position sensor information can be used to perform analysis of the three dimensional real-world surrounding, such as depth analysis and surface reconstruction, to compute or otherwise determine the spatial location of the mixed reality device 100 in the user's real-world surrounding.

The optical and position sensor information can also be used to create spatial mapping data that is a virtual representation of the real-world surrounding. In some embodiments, the spatial mapping data may define a three dimensional coordinate space that corresponds to the three dimensional coordinate space of the real-world surrounding. Using the spatial mapping data, the mixed reality device 100 can automatically track where the user is looking so that the device can determine where in the user's field of view to insert virtual objects, thus creating a mixed reality world experience for the user 10.

The user 10 can interact with virtual objects and real-world objects appearing within their field of view. As used herein, the term "interact" encompasses both physical interaction and verbal interaction. Physical interaction includes the user 10 performing predefined gestures using their fingers, hand, head and so on that can be recognized by the mixed reality device 100 as a user request for the device to perform a predefined action on the virtual or real-world object. Such predefined gestures can include, but are not limited to, pointing at, grabbing, and pushing virtual objects, hand waving motions, and the like. Other gestures can include an "air tap" on the virtual or real-world object, in which the user 10 gazes at the object and forms an "L" with their thumb and forefinger, and making a pinching motion by touching the tip of one to the tip of the other. An interaction can simply consist of the user 10 gazing in the direction of the virtual or real-world object.

The user 10 can interact with virtual and real-world objects using verbal gestures such as speaking a word or phrase that is recognized by the mixed reality device 100 as a user request for the device to perform a predefined action. Verbal gestures can be used in conjunction with physical gestures to interact with virtual and real-world objects in the mixed reality world.

As the user 10 moves around within their mixed reality world, a virtual object may be "world-locked"; in other words, the virtual object is spatially locked with respect to the user's real-world surrounding. The virtual object can remain anchored and stationary in the mixed reality world so that the user 10 can move around the world-locked virtual object and see it from different perspectives and distances, as if the virtual object physically existed in the user's real-world surrounding (hence "mixed reality").

Figure 3:
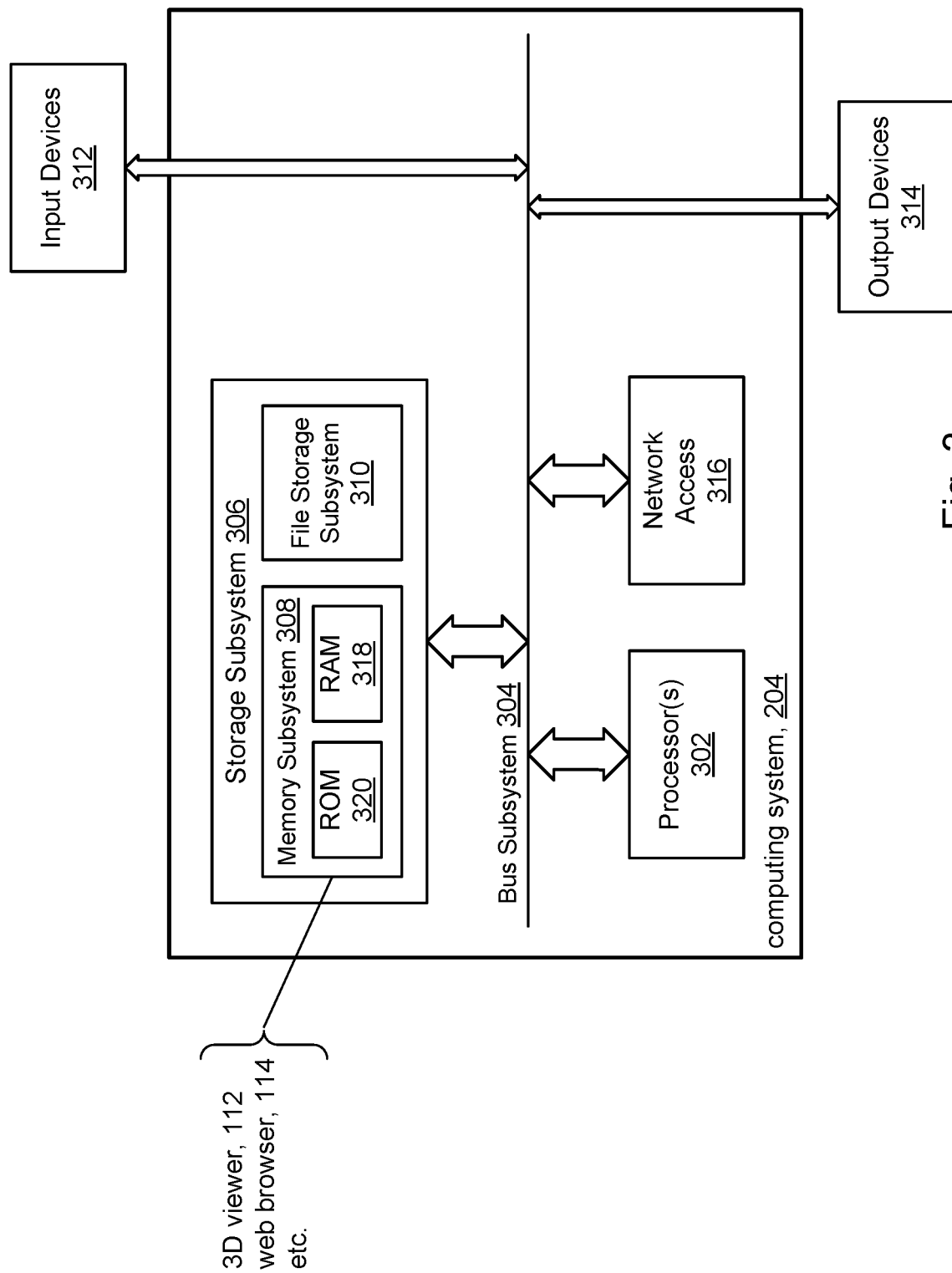
FIG. 3 depicts a simplified block diagram of an example computing system according to various embodiments.

FIG. 3 depicts a simplified block diagram of an example of computing system 204 according to certain embodiments. As shown in FIG. 3, computing system 204 includes one or more processors 302 that communicate with a number of peripheral devices via a bus subsystem 304. These peripheral devices include a storage subsystem 306 (comprising a memory subsystem 308 and a file storage subsystem 310), input devices 312, output devices 314, and network access 316.

Bus subsystem 304 can provide a mechanism for enabling the various components and subsystems of computing system 204 to communicate with each other as intended. Although bus subsystem 304 is shown schematically as a single bus, alternative embodiments of the bus subsystem can utilize multiple busses.

Network access 316 can include a wireless interface that can implement wireless standards such as WiFi and Bluetooth, in various embodiments. In other embodiments, network access 316 may support wired communications. Network access 316 can serve as an interface for communicating data between computing system 204 and other computer systems or networks; e.g., to access website 14 (FIG. 1).

Input devices 312 include microphones 208a, 208b and cameras 212a, 212b, shown in FIG. 2. Output devices 314 include display 206 and speakers 210a, 210b.

Storage subsystem 306 includes a memory subsystem 308 and a file/data storage subsystem 310. Subsystems 308 and 310 represent non-transitory computer-readable storage media that can store program code (e.g., 3D viewer 112, web browser 114) and/or data (e.g., holographic button 102, item-related data 22a) that provide and support the functionality of embodiments in accordance with the present disclosure.

Memory subsystem 308 includes a number of memories including a main random access memory (RAM) 318 for storage of instructions and data during program execution and a read-only memory (ROM) 320 in which fixed instructions are stored. File storage subsystem 310 can provide persistent (i.e., non-volatile) storage for program and data files, and can include a solid-state drive.

It should be appreciated that computing system 204 is illustrative and many other configurations having more or fewer components are possible.

Figure 4:
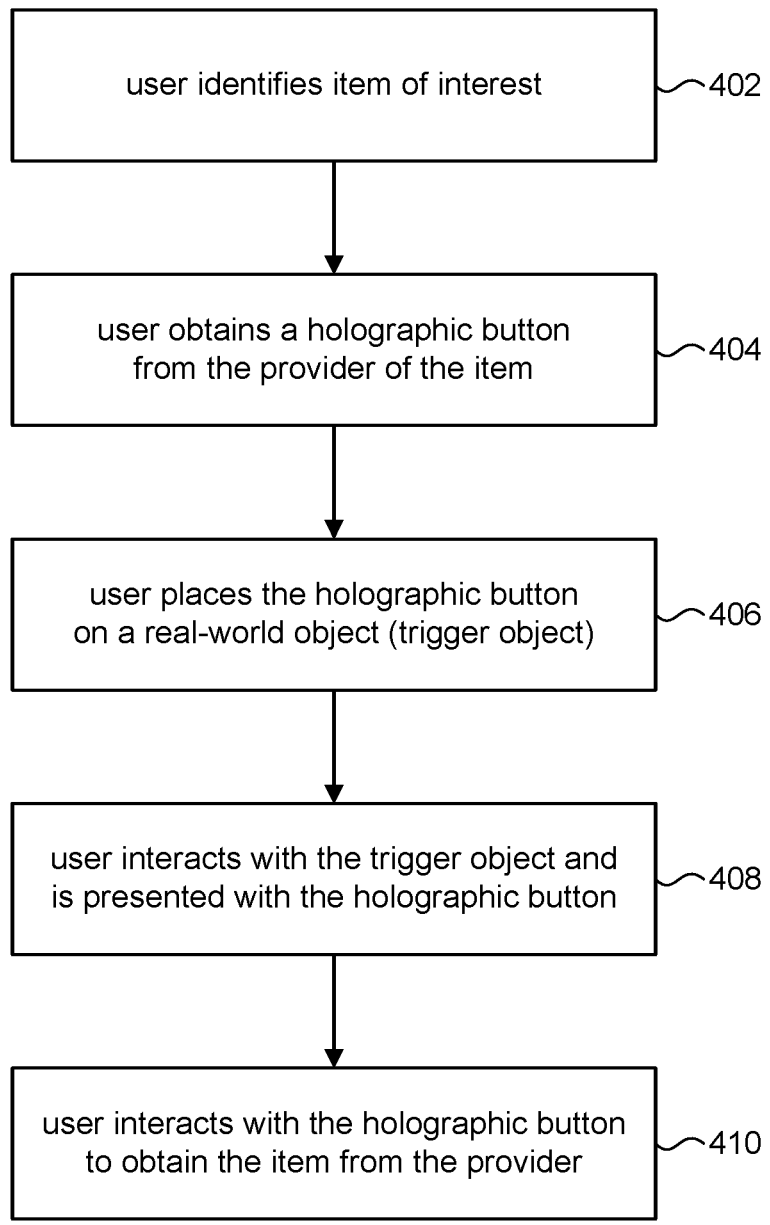
FIG. 4 is a high level flow of operations in accordance with various operations.

FIG. 4 illustrates a high level process for a holographic button 102 in a mixed reality world in accordance with the present disclosure. Generally, the holographic button 102 facilitates the user 10 in obtaining an item 22 that the holographic button 102 is associated with.

At block 402, a user 10 can identify or otherwise become interested in an item 22. Merely as an illustrative example suppose in one example the item is laundry detergent (a good).

At block 404, the user 10, using a mixed reality device (e.g., 100), can obtain a holographic button 102 from the provider 12 of the item 22. For example, if the laundry detergent is sold at a grocery store, the user can navigate to the grocer's website and download a holographic button corresponding to the laundry detergent from the grocer's website. The holographic button can be any image defined by the grocer; for example, the image may be a box of detergent.

At block 406, the user 10 can virtually place the downloaded holographic button 102 on or near a real-world object (call it the trigger object). For example, the trigger object might be a washing machine for the laundry detergent example. The holographic button for the laundry detergent can be placed somewhere on the washing machine, or near (e.g., on a wall) the washing machine.

At this point, the holographic button 102 has been obtained from the provider's website 14 and placed in the user's mixed reality world. The user 10 can exit their mixed reality world and at a later time return to the mixed reality world to obtain the item 22 using the holographic button 106. For example, if the user 10 is doing laundry, they may realize they are low on laundry detergent. The user 10 may order additional laundry detergent using the holographic button 102 in their mixed reality world.

At block 408, for example, the user 10 can re-enter their mixed reality world and interact with the washing machine (e.g., gaze toward the washing machine).

when the user 10 interacts with the trigger object the holographic button 102 can become visible to the user 10. Interaction with the trigger object may include the user 10 physically touching the trigger object, or in some embodiments, simply directing their gaze toward the trigger object. Using gaze direction as an interaction can be useful if it is inconvenient for the user 10 to be physically near the trigger object. For example, if the user 10 is far away from the washing machine, they need simply to gaze in the direction of the washing machine in their mixed reality world, and in response the mixed reality device can make visible the holographic button 102 for laundry detergent.

At block 410, when the holographic button 102 becomes available to the user 10, the user 10 can interact with it to initiate an action with the provider to obtain the item 22. In some embodiments, the interaction may involve the user making suitable gestures directed to the holographic button 102 to initiate the action. In some embodiments, the mixed reality device may interact with the user 10 to obtain or authorize a payment instrument.

Thus, once the holographic button for an item has been downloaded and placed, the item can be subsequently re-ordered simply by accessing the holographic button. Placement of the holographic button on or near a relevant object provides contextual cues that allow the user to locate the holographic button. The user need not maintain a list of holographic buttons; instead holographic buttons simply show up in the user's mixed reality world in the proper context (e.g., a laundry detergent button on the washing machine, a cleaning service button on the broom closet door, etc.).

It can be appreciated from the foregoing illustrative description that the use of holographic buttons in accordance with the present disclosure to obtain goods or services can reduce bandwidth usage in the mixed reality device. Since the holographic button already provides the information needed by the user to initiate a request to order the item, the user can skip steps that require network resources such as accessing the provider's website and navigating through to the particular web page that contains the item.

In addition to reducing bandwidth usage, the use of holographic buttons in accordance with the present disclosure can reduce storage requirements for storing browser history. When a user is required to search the Internet for items of interest, especially consumable items that require re-ordering, the browser history can become cluttered from those search efforts. Associating such items with holographic buttons in accordance with the present invention obviates the need for repeated searches for those items and thus can reduce the amount of browser history that is stored in memory.

It can be appreciated that navigating the Internet in a mixed reality world can be taxing to the user, requiring gestures and textual input to access various websites. User interaction performance and reliability can be markedly enhanced by the use of the holographic button of the present disclosure, which can reduce the amount of user interaction to achieve the same goal of obtaining items from the Internet.

Figure 5:
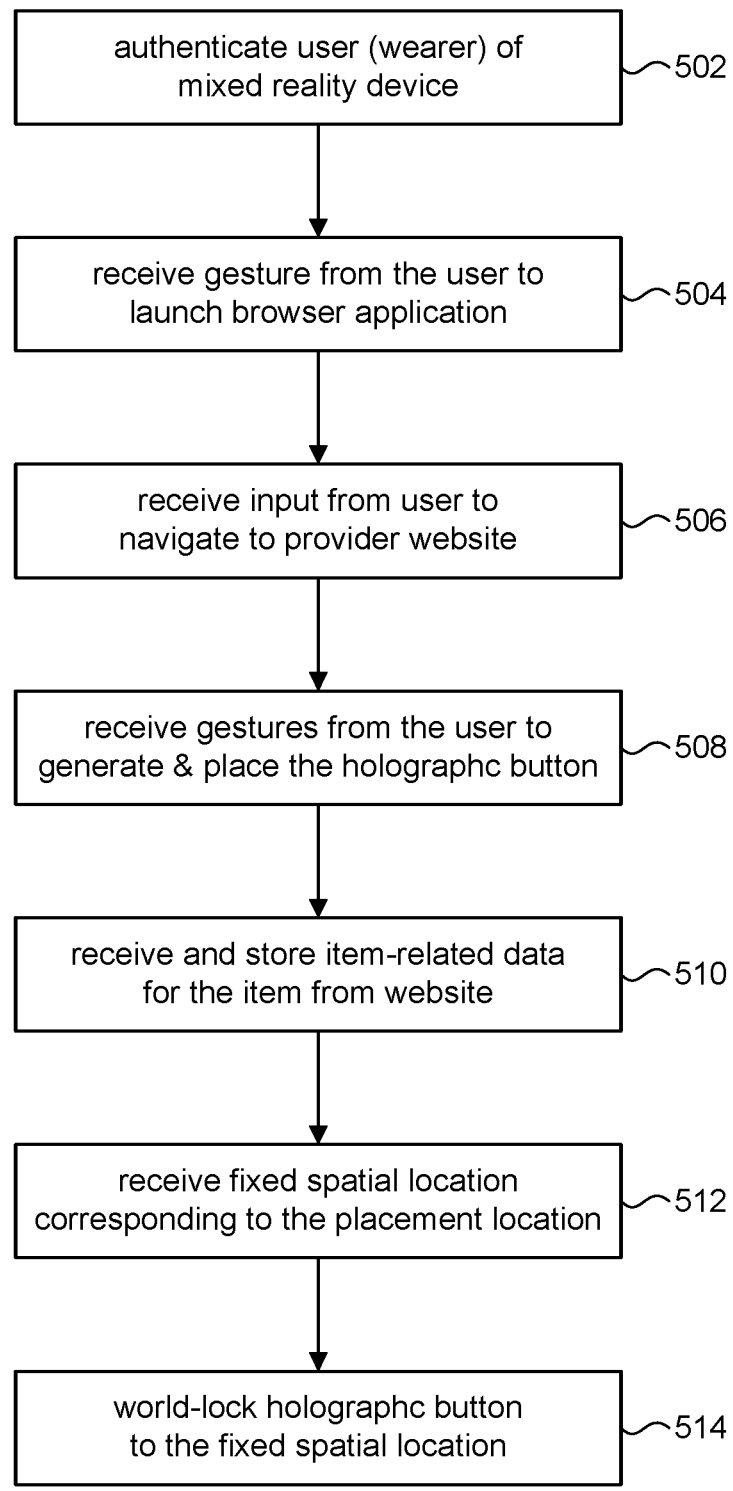
FIG. 5 is a high level flow of operations for instantiating a holographic button in accordance with various embodiments.

Referring to FIG. 5, the discussion will now turn to a description of processing in the mixed reality device 100 for instantiating a holographic button 102 in accordance with the present disclosure. In some embodiments, for example, the mixed reality device 100 can include computer executable program code, which when executed by a computing system (e.g., 204, FIG. 3), can cause the computing system to perform processing in accordance with FIG. 5. The flow of operations performed by the computing system is not necessarily limited to the order of operations shown. The holographic button 102 can be more generally referred to as a 3-dimensional (3D) object.

At block 502, the mixed reality device 100 can authenticate the user 10 when they enter their mixed reality world. In some embodiments, for example, authentication may include displaying a virtual keyboard in the user's field of view and receiving or otherwise detecting gestures made by the user 10 that correspond to key taps on the virtual keyboard to enter an authorization code. In other embodiments, the user 10 can speak with the mixed reality device 100 to become authorized. When the user 10 is authorized, the mixed reality device 100 can then access the user's user profiles or other similar information.

At block 504, the mixed reality device 100 can receive gestures from the user to launch a web browser 114. In response, the mixed reality device 100 can superimpose a browser window onto the user's field of view of their real-world surrounding. In some embodiments, the browser window can be displayed in mixed world view mode. In mixed world view, the web browser 114 appears on top of the user's field of view, along with any other application window the user 10 may have open.

At block 506, the mixed reality device 100 can receive input from the user 10 to navigate the Internet on the web browser 114. The input can include any combination of gestures, keyboard inputs, voice inputs, and the like made by the user 10. In the context of the present disclosure, the user 10 can navigate to the website 14 of the provider 12 for an item 22 of interest to the user 10; e.g., laundry detergent, referring to the illustrative examples mentioned above. The user 10 can further navigate the provider's website 14 to get to a web page that contains a link 14a (FIG. 1) to the item 22. In accordance with the present disclosure, the link 14a can be associated with a holographic button 102 of the item 22.

At block 508, the mixed reality device 100 can receive user gestures for generating and placing the holographic button 102. For example, the user 10 can walk around in their real-world surrounding to determine a relevant real-world object to place the holographic button 102. In the laundry detergent example above, the user 10 may walk over to their washing machine. In an office setting example, the item 22 might be copier paper in which case the user 10 may want to place the holographic button 102 on or near the copying machine, and so on. The user 10 can make suitable gestures that direct the placement of the holographic button 102 on the real-world object.

In some embodiments, for example, the user 10 can make gestures to access the link 14a. For instance, the user 10 can direct their gaze at the link 14a and use an air tap gesture to select the link 14a and cause the holographic button 102 to be generated. In response, the mixed reality device 100 can download item-related data 22a associated with the item 22 from the provider's website 14 used to generate the holographic button 102; e.g., the item-related data 22a can include holographic data 26 that defines the holographic button 102. In accordance with the present disclosure, the mixed reality device 100 can use the holographic data 26 to create a data object for the holographic button 102 that can be stored in a memory (e.g., 308, FIG. 3) of the mixed reality device 100. The user 10 can gesture to place the generated holographic button 102 onto the relevant real-world object, for example, by moving their hand to drag the generated holographic button 102 toward and releasing the generated holographic button 102 to drop it on or near the relevant real-world object.

In other embodiments, the user 10 can use a drag-and-drop gesture. For example, the user 10 can drag-and-drop the link 14a onto the relevant real-world object. The user 10 can direct their gaze at the link 14*a* and use an air tap gesture to select and hold the link 14*a*, and move their hand to drag the link 14*a* to the relevant real-world object and release (drop) the link 14*a*. The mixed reality device 100 can use the holographic data 26 to generate the holographic button 102.

At block 510, the mixed reality device 100 can receive and store the item-related data 22*a* associated with the item 22 from the provider's website 14, in response to the user's placement action of the holographic button 102. In accordance with the present disclosure, the item-related data 22*a* can include ordering information 24 associated with the item 22, which can be used to create an order request to obtain the item 22. In some embodiments, the downloaded item-related data 22*a* can be stored in a memory (e.g., 308, FIG. 3) of the mixed reality device 100 or in remote storage (e.g., cloud-based storage).

At block 512, the mixed reality device 100 can receive or otherwise obtain a fixed spatial location corresponding to the drop location of the placement action. For example, when the user 10 makes a gesture to drop the holographic button 102, the user's direction of gaze at that moment can be used to determine the drop location. Sensors on the mixed reality device 100 can be used to determine the fixed spatial location in the real-world surrounding that corresponds to that drop location.

At block 514, the mixed reality device 100 can world-lock the holographic button 102 to the fixed spatial location determined above. In some embodiments, for example, the mixed reality device 100 can generate spatial mapping data that represents the real-world surrounding, or can access previously generated spatial mapping data. As the user 10 manipulates the holographic button 102 relative to the real-world surrounding in their field of view, the mixed reality device 100 tracks the movement of the holographic button 102 using the spatial mapping data. For example, when the user 10 drops the holographic button 102 on the surface of a real-world object, the mixed reality device 100 can associate the holographic button 102 with spatial mapping data that corresponds to the fixed spatial location of the surface of that real-world object, thus world-locking the holographic button 102 to that real-world object.

The holographic button 102 is world-locked in the sense that the holographic button 102 maintains its location with respect to the fixed spatial location in the real-world surrounding. When the user 10 moves away from that fixed location (e.g., into another room or if they turn their head away), the holographic button 102 will remain fixed to that location and eventually disappear from the user's field of view as would any other real-world object.

The holographic button 102 is deemed to be instantiated at this point, having been downloaded to the mixed reality device 100 and world-locked to a real-world object (vis-à-vis its spatial location in the real-world surrounding). The holographic button 102 and its drop location can be stored on the mixed reality device 100, so that even if the user 10 walks away from the drop location or exits their mixed reality world (e.g., log out of the mixed reality device 100), the holographic button 102 and its drop location persists.

Figure 6:
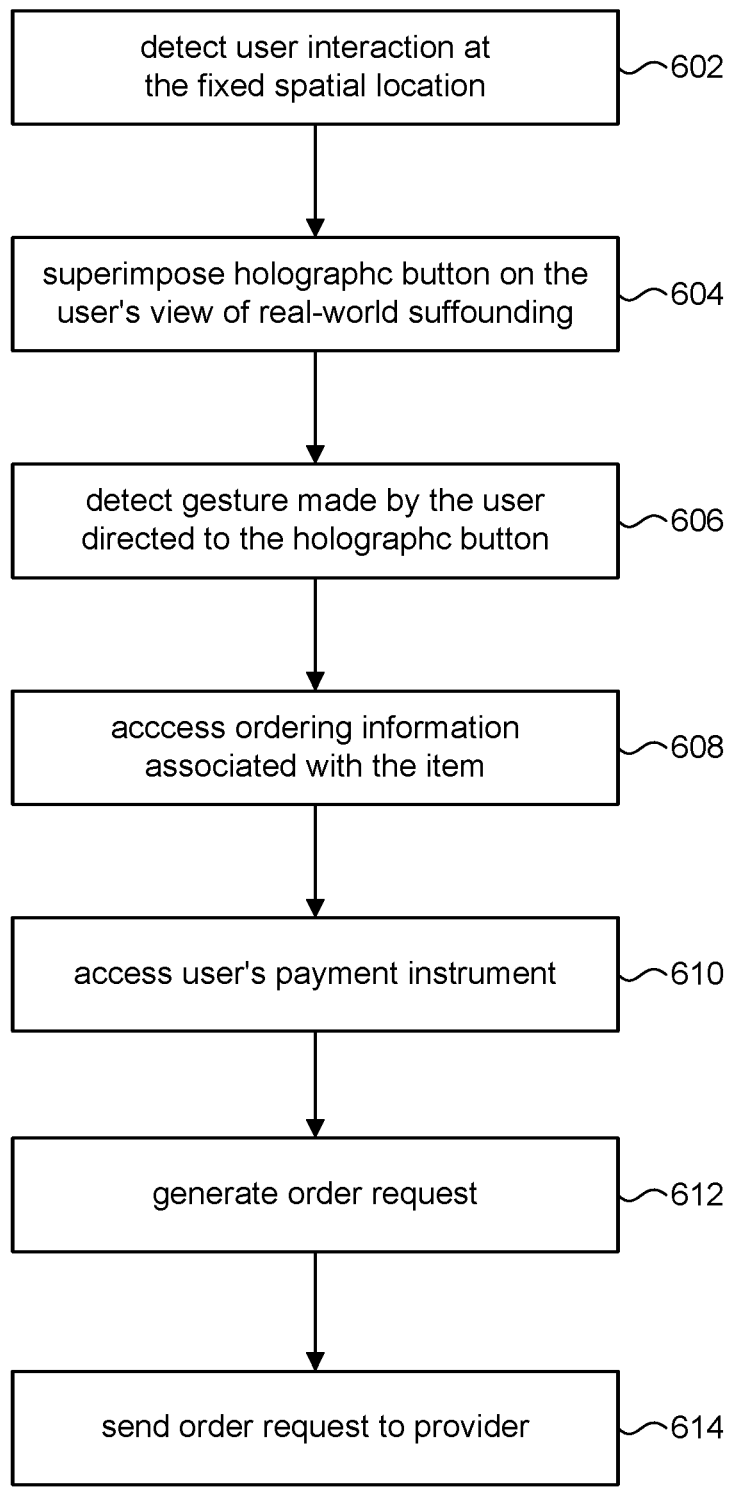
FIG. 6 is a high level flow of operations for using an instantiated holographic button in accordance with various embodiments.

Referring to FIG. 6, the discussion will now turn to a description of processing in the mixed reality device 100 for using an instantiated holographic button 102 in accordance with the present disclosure to order the item 22 associated with the holographic button 102.

In some embodiments, for example, the mixed reality device 100 can include computer executable program code, which when executed by a computing system (e.g., 204, FIG. 3), can cause the computing system to perform processing in accordance with FIG. 6. The flow of operations performed by the computing system is not necessarily limited to the order of operations shown.

At block 602, the mixed reality device 100 can detect user interaction at a fixed spatial location that is associated (tagged) with a previously instantiated holographic button 102. For example, when the user 10 enters their mixed reality world, they may approach the real-world object (e.g., washing machine) that was previously tagged with a holographic button 102. Using the spatial mapping data of the real-world environment to track the user 10, the mixed reality device 100 can detect when the user 10 is interacting with that real-world object.

At block 604, the mixed reality device 100 can display the holographic button 102 in the user's field of view in response to detecting that the user 10 is interacting with a real-world object that was previously tagged with a holographic button 102. For example, the mixed reality device 100 can display the holographic button 102 on the display 206, thus superimposing the holographic button 102 onto the user's perception of their real-world surrounding.

At block 606, the mixed reality device 100 can detect gestures made by the user 10 and directed to the holographic button 102 to initiate an action to obtain the item 22 that is associated with the holographic button 102. For example, the user 10 can direct their gaze on the holographic button 102 and perform an air tap gesture. The user 10 will have selected the item 22 and initiated activity to obtain the item 22 simply by looking at a real-world object (e.g., washing machine) and making an appropriate gesture (e.g., air tap), without having to invoke a web browser, navigate to the provider's website 14, navigate to the web page to get to the item 22, and perform interactions on the web page to order the item 22.

At block 608, the mixed reality device 100 can access the ordering information 24 associated with the item 22. In some embodiments, the ordering information can be previously stored in the mixed reality device 100, for example, when the user 10 downloaded the holographic button 102 from the provider's website 14. In other embodiments, the mixed reality device 100 can access the ordering information 24 from the provider's website 14 on an as needed basis (e.g., using the provider's site API 16).

At block 610, the mixed reality device 100 can access the user's payment information, such as name, billing address, mailing address, credit card no., CVV, etc. The payment instrument can be a credit/debit card, a token associated with the credit/debit card, a PayPal® account, a bank account, a physical check (e.g., the mixed reality device 100 can read such a check and use it), and so on. In some embodiments, the user's payment information can be linked to their user profile or otherwise stored locally; e.g., in a discreet secure micro-controller or a secure memory partition in memory. In other embodiments, the user's payment information can be stored on a cloud server.

In some embodiments, the user's payment may not be stored anywhere. In those cases, the mixed reality device 100 can capture the payment information from the user 10 at the time the user 10 initiates the action (via the holographic button 102) to obtain the item 22. For example, the mixed reality device 100 may instruct the user 10 to input their payment information, hold up their credit card so an image of it can be taken, present a check, and the like.

At block 612, the mixed reality device 100 can generate an order request to order the item 22. In some embodiments, for example, the order request can include ordering information 24 for the item 22 and a payment component. The payment component can be an API call to the payment API 124*a*. For example, the API call can be a concatenation of the data related to the item as well as user authentication data that would be used to conduct a payment transaction.

At block 614, the mixed reality device 100 can send the order request to the provider 12 of the item 22 to fulfill the order. For example, the provider 12 can invoke the API call to conduct a payment transaction for the item 22 and then fulfill the order. In some cases, the API call can create a payment experience in order for the user 10 to confirm their payment information prior to fulfillment of the order. This would be useful, for example, if there are multiple payment instruments associated with the user's account or multiple billing/shipping addresses. The user authentication data could result from the user 10 having entered their credentials, or having been authenticated by a PIN or any biometric gesture such as voice recognition or iris scan.

Ordering goods or services (items) using a holographic button in accordance with aspects of the present disclosure can reduce processing resources required by the mixed reality device 100. Bandwidth requirements can be reduced because the user need only navigate to the provider's website once to download a holographic button associated with the item. Once the holographic button has been previously placed in the user's mixed reality world, the user need only look for the holographic button and make a gesture (e.g., air tap) to invoke a series of actions to order the item, without having to re-visit the providers' website.

The use of holographic buttons to order items that require frequent re-ordering can improve user efficiency because the use of holographic buttons obviate the need to navigate the Internet, which can be time consuming and error prone. The increased user efficiency means less transmission time over the wireless communication channel between the mixed reality device and an Internet access point, which can reduce consumption of the device's power source (e.g., battery).

The user can instantiate as many holographic buttons for ordering items as they want and populate them around in their mixed world reality. The user's view of their real-world surrounding through the mixed reality device can remain uncluttered because a holographic button only appears in the user's field of view when the user is interacting with a real-world object that is associated with a holographic button.

Embodiments in accordance with the present disclosure provide a path for the natural evolution of mixed reality e-commerce. Just as markets appeared for traditional trade (e.g., large department stores arose for mass commercialization of goods), online merchants (e.g., Amazon) appeared for e-commerce. Solutions represented by embodiments in accordance with the present disclosure are beginning to appear for mixed reality e-commerce. Traditional "flat" e-commerce is not ideal for interacting in a shoppable mixed world. Embodiments in accordance with the present disclosure can provide accessibility, breadth of goods and services, and convenience of e-commerce with the ease of interaction of physical shopping to enable and facilitate the adoption of mixed reality e-commerce.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A mixed reality device comprising:
   a display;
   one or more computer processors; and
   a computer-readable storage medium comprising instructions for controlling the one or more computer processors to:
   receive identification of an item from the user;
   receive a gesture from the user to create a holographic button associated with the item;
   instantiate the holographic button, including receiving item-related data associated with the item from a website of a provider of the item, the item-related data comprising holographic data to display the holographic button on a display of the mixed reality device;
   receive a placement gesture from the user to place the holographic button;
   world-lock the holographic button to a fixed spatial location in a real-world surrounding relative to the mixed reality device, based on the user's placement gesture, using spatial mapping data representative of the real-world surrounding;
   provide a user of the mixed reality device with access to the holographic button to obtain the item using the holographic button, including displaying the holographic button on the display to superimpose the holographic button onto a view of the user's real-world surrounding;
   detect interactions by the user with a real-world object at the fixed spatial location in the real-world surrounding associated with the holographic button; and
   in response to the detecting the interaction, superimpose the holographic button onto the view of the user's real-world surrounding.

2. The mixed reality device of claim 1, further comprising a payment instrument repository, wherein accessing a payment instrument associated with the user includes accessing the payment instrument repository.

3. The mixed reality device of claim 1, wherein accessing a payment instrument associated with the user includes interacting with the user of the mixed reality device to obtain payment information from the user.

4. The mixed reality device of claim 1, wherein receiving item-related data from the website of the provider includes navigating to the provider's website using navigation commands provided by the user and downloading the item-related data from the provider's website using additional commands provided by the user.

5. The mixed reality device of claim 1, wherein instantiating the holographic button further includes:

downloading information using a link on the provider's website that is associated with the item;

generating the holographic button using the downloaded information; and world-locking the holographic button by associating the holographic button with spatial mapping data that corresponds to a location of the user's direction of gaze.

6. The mixed reality device of claim 1, wherein the ordering information that describes the item is included with the item-related data received from the provider's website, wherein instantiating the holographic button further includes associating the holographic button with the ordering information, and in response to detecting a gesture directed to the holographic button, generating the order request using the ordering information that is associated with the holographic button.

7. The mixed reality device of claim 1, wherein the computer-readable storage medium further comprises instructions for controlling the one or more computer processors to respond to detecting a gesture directed to the holographic button by:

accessing from the provider's website the ordering information that describes the item; and generating the order request using the accessed ordering information.

8. The mixed reality device of claim 1, wherein the mixed reality device is a wearable device.

9. A method in a mixed reality device, the method comprising:

receiving identification of an item from the user;

receiving a gesture from the user to create a holographic button associated with the item;

instantiating the holographic button including receiving item-related data associated with the item from a website of a provider of the item, the item-related data comprising holographic data to display the holographic button on a display of the mixed reality device;

receiving a placement gesture from the user to place the holographic button;

world-locking the holographic button to a fixed spatial location in a real-world surrounding relative to the mixed reality device, based on the user's placement gesture, using spatial mapping data representative of the real-world surrounding;

providing a user of the mixed reality device with access to the holographic button to obtain the item using the holographic button, including superimposing the holographic button onto a view of the user's real-world surrounding;

detecting interactions by the user with a real-world object at the fixed spatial location in the real-world surrounding associated with the holographic button; and in response to the detecting the interaction, superimposing the holographic button onto the view of the user's real-world surrounding.

10. The method of claim 9, wherein accessing a payment instrument associated with the user includes accessing a payment instrument repository.

11. The method of claim 9, wherein accessing a payment instrument associated with the user includes interacting with the user of the mixed reality device to obtain payment information from the user.

12. The method of claim 9, wherein receiving item-related data from the website of the provider includes navigating to the provider's website using navigation commands provided by the user and downloading the item-related data from the provider's website using additional commands provided by the user.

13. The method of claim 9, wherein instantiating the holographic button further includes:

downloading information using a link on the provider's website that is associated with the item;

generating the holographic button using the downloaded information; and world-locking the holographic button by associating the holographic button with spatial mapping data that corresponds to a location of the user's direction of gaze.

14. The method of claim 9, further comprising:

detecting interactions by the user with a real-world object at the fixed spatial location in the real-world surrounding associated with the holographic button; and in response to the detecting the interaction, superimposing the holographic button onto the view of the user's real-world surrounding.

15. A non-transitory computer-readable storage medium having stored thereon computer executable instructions, which when executed by a computer device in a mixed reality device, cause the computer device to:

receive identification of an item from the user;

receive a gesture from the user to create a holographic button associated with the item;

instantiate the holographic button, including receiving item-related data associated with the item from a website of a provider of the item, the item-related data comprising holographic data to display the holographic button on a display of the mixed reality device;

receive a placement gesture from the user to place the holographic button;

world-lock the holographic button to a fixed spatial location in a real-world surrounding relative to the mixed reality device, based on the user's placement gesture, using spatial mapping data representative of the real-world surrounding;

providing a user of the mixed reality device with access to the holographic button to obtain the item using the holographic button, including superimposing the holographic button onto a view of the user's real-world surrounding;

detect interactions by the user with a real-world object at the fixed spatial location in the real-world surrounding associated with the holographic button; and in response to the detecting the interaction, superimpose the holographic button onto the view of the user's real-world surrounding.

16. The non-transitory computer-readable storage medium of claim 15, wherein receiving item-related data from the website of the provider includes navigating to the provider's website using navigation commands provided by the user and downloading the item-related data from the provider's website using additional commands provided by the user.

17. The non-transitory computer-readable storage medium of claim 15, wherein instantiating the holographic button further includes:

downloading information using a link on the provider's website that is associated with the item;

generating the holographic button using the downloaded information; and world-locking the holographic button by associating the holographic button with spatial mapping data that corresponds to a location of the user's direction of gaze.

* * * * *